United States Patent
Ortel

[15] 3,694,052
[45] Sept. 26, 1972

[54] ELECTROOPTIC MODULATOR UTILIZING PHASE RETARDATION EFFECT OF INTERNAL REFLECTIONS

[72] Inventor: William Charles Gormley Ortel, New York, N.Y.

[73] Assignee: Bell Telephone Laboratories, Incorporated, Murray Hill, N.J.

[22] Filed: Feb. 1, 1971

[21] Appl. No.: 111,258

[52] U.S. Cl. .................350/150, 350/151, 350/152
[51] Int. Cl. ..............................................G02f 1/26
[58] Field of Search............350/147, 150, 151, 157, 160–161, 350/152; 250/199

[56] References Cited

UNITED STATES PATENTS

| | | | |
|---|---|---|---|
| 3,506,929 | 4/1970 | Ballman et al. | 350/150 |
| 3,506,335 | 4/1970 | Zook | 350/150 |
| 3,402,002 | 9/1968 | Eden | 350/150 |
| 3,504,958 | 4/1970 | Duinker et al. | 350/150 |
| 3,497,831 | 2/1970 | Hickey et al. | 350/150 |
| 3,431,418 | 3/1969 | Stone | 350/150 |
| 3,432,223 | 3/1969 | Uchida | 350/150 |
| 3,360,323 | 12/1967 | Weisman et al. | 350/150 |

OTHER PUBLICATIONS

Horton et al., " A Triple Reflection Polarizer for Use in the Vacuum Ultraviolet," App. Opt. Vol. 8, No. 3 (March 1969) pp. 667–670.

*Primary Examiner*—David Schonberg
*Assistant Examiner*—Paul R. Miller
*Attorney*—R. J. Guenther and Kenneth B. Hamlin

[57] ABSTRACT

A lithium tantalate crystal is configured to have plural surfaces for producing sufficient internal reflection of a light beam to effect approximately a complete phase reversal of one component of the electric vector, which vector is transverse to the direction of propagation, of the beam within the crystal between two separate electrooptic modulation operations on the same beam within that crystal.

10 Claims, 4 Drawing Figures

ELECTROOPTIC MODULATOR UTILIZING PHASE RETARDATION EFFECT OF INTERNAL REFLECTIONS

BACKGROUND OF THE INVENTION

1. Field of the Invention

This invention relates to electrooptic modulators and it particularly relates to such modulators in which plural successive modulation operations are performed in order to achieve compensation for an undesirable modulation product.

2. Description of the Prior Art

In optical and electrical systems it is known to employ successive transmissions of a signal stream through a transmission medium wherein a signal modulation is accomplished as to one characteristic and spurious modifications as to another characteristic are offset against one another. In electrooptic modulators, temperature effects arising from environmental conditions and from signal conditions are often troublesome. Attempts have been made to overcome such effects with various degrees of success by transmitting a light beam which is to be modulated through two successive modulation crystals in tandem and wherein the crystal are, by one means or another, effectively differently oriented with respect to the light beam.

For example, it is known to utilize a rotatory member in the optical path between the crystals for rotating the plane of polarization of the light to permit modulation to be effected in the second crystal in a way which is additive in the two crystals for the desired modulation but subtractive insofar as temperature effects are concerned. However, in such arrangements the light beam is often caused to pass through successive air-crystal interfaces and is subjected to a loss of about 15 per cent in beam intensity at each such interface transition. Some attempts have been made to reduce the effects of such losses by bonding the modulator and rotatory crystals together to eliminate air-crystal interfaces. Similarly, attempts have been made to utilize plural bonded, but differently oriented, modulator crystals which also have differently oriented electric field modulation drives. However, in either of these arrangements, certain manufacturing problems arise which are of considerable moment.

Multiple discrete crystals must be accommodated for manufacture in all cases, and sometimes these crystals must comprise different materials. It is thus necessary to match the crystal characteristics carefully prior to assembly and then secure the crystals together in a reasonably accurate relationship. It is also desirable to employ an acoustically damped crystal mounting of the type in the copending application Ser. No. 780,347, filed Dec. 2, 1968, of M. R. Biazzo, B. G. King, and W. C. G. Ortel and now U.S. Pat. 3,614,201; and the mounting and optical alignment problems are greatly compounded if plural crystals are involved. The latter is especially true if crystal bonding materials employed are adversely affected by the level of temperatures required to achieve a desired mounting.

It is, therefore, one object of the present invention to improve electrooptic modulators.

Another object is to reduce the need for bonding multiple crystals into a unitary assembly.

A further object is to achieve, entirely within a crystal of electrooptic modulating material, a predetermined phase retardation between the orthogonal components of the transverse electric vector of a light beam.

STATEMENT OF THE INVENTION

The foregoing and other objects of the invention are realized in an illustrative embodiment in which a member which is capable of transmitting a light beam is arranged to include first and second paths for the transmission of such a beam in tandem within the member. Such member is configured to effect reflection of the beam within the member and in optical tandem between the first and second transmission paths to produce a phase retardation between the $s$ and $p$ amplitude components of the electric vector of the beam to effectively reverse the sense of its elliptical polarization state and thus to facilitate the performance in the two paths of tandem, additive, signal modulations that are subtractively compensating for spurious modulation effects.

It is one feature of the invention that the member is an electrooptic modulator crystal and includes in association therewith structures for applying separate electrooptic modulating fields across each of the beam transmission paths.

A feature of one embodiment of the invention is that the first and second beam paths are parallel to one another and oppositely directed within a unitary crystal member of common electrooptic modulation material.

A feature of a further embodiment of the invention is that the beam paths are parallel and substantially collinear within a unitary crystal member of a common electrooptic modulation material.

BRIEF DESCRIPTION OF THE DRAWING

A more complete understanding of the invention may be derived from a consideration of the following detailed description and the appended claims in connection with the attached drawing in which:

DETAILED DESCRIPTION

Figure 1A:
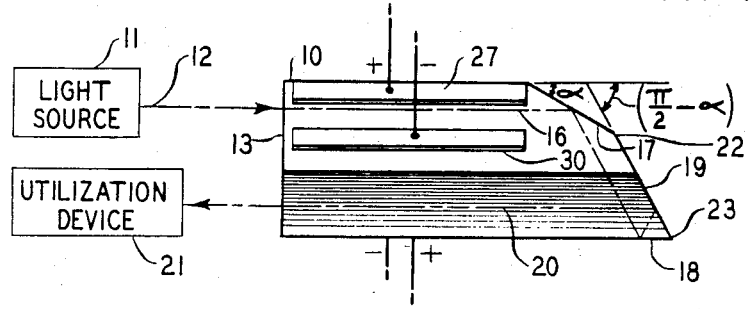
FIGS. 1A and 1B are side and end views of a first embodiment of the invention.
Figure 1B:
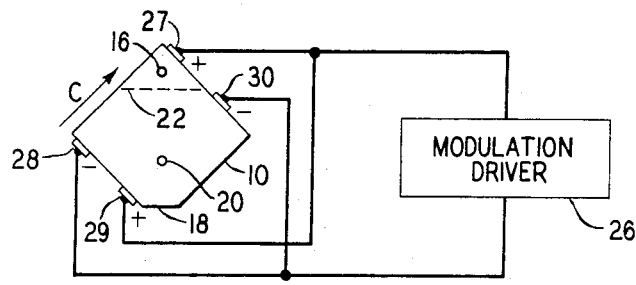

FIGS. 1A and 1B illustrate one embodiment of the invention which utilizes the fact that internal reflections of a light beam within a dielectric material crystal produce predictable amounts of phase retardation between the $p$ component of the electric vector, i.e., that component parallel to the plane of incidence, and the orthogonal $s$ component of the beam. The plane including incident and reflected beam paths is the plane of incidence. It has been found that, by suitably configuring a modulator crystal, sufficient internal reflection is produced to cause adequate phase retardation in the beam to allow compensating modulation functions as to spurious effects to be performed on the beam prior to and subsequent to the mentioned beam reflection. Thus, given a modulator material, it is only necessary for the modulator designer to determine the phase retardation-versus-angle-of-incidence characteristics for internal reflections for that material. The number of reflections needed to achieve a desired phase retardation in a convenient manner is then selected.

Figure 3:
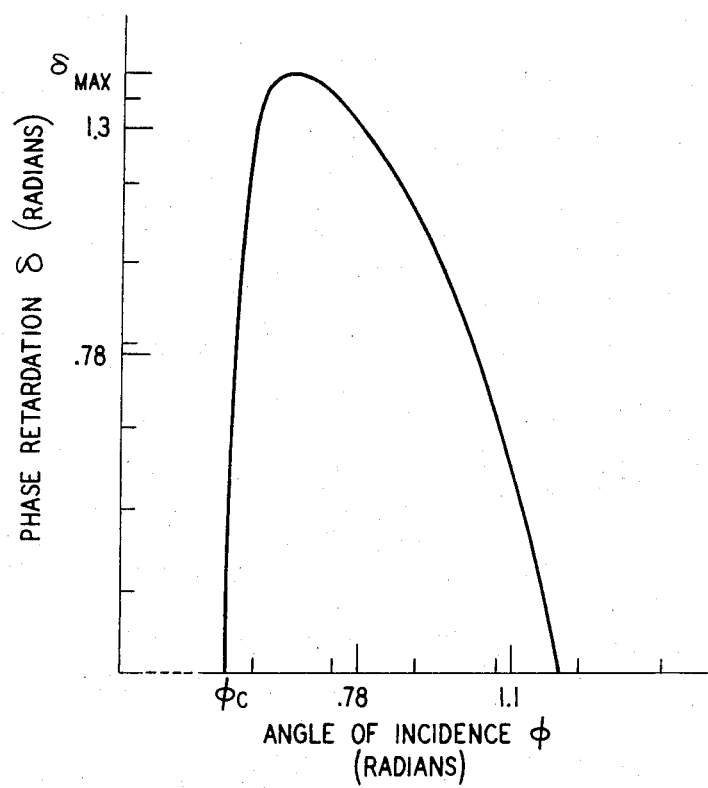
FIG. 3 is a diagram of a phase-retardation-versus-angle-of-incidence characteristic for a material used in the invention.

Modulator design is facilitated to a certain extend because it is known that the phase-retardation-versus-angle-of-incidence characteristic of many modulator materials has a humped shape above the critical angle of incidence at which total internal reflection sets in. An illustrative characteristic for lithium tantalate is shown in FIG. 3 for the part above a critical angle $\Phi_c$ of about 0.48 radian and including a maximum retardation $\delta_{max}$ of about 1.42 radians occurring at an angle $\Phi$ of about 0.65 radian. At some angle above that critical angle, maximum retardation for a single internal reflection is realized and lesser degrees of retardation are realized at each of two different angles of incidence, one greater than and one less than the angle of maximum retardation, for each lower retardation level. Having then selected the number of reflections to be employed, the designer configures his modulator crystal to achieve those reflections with a common plane of incidence and in optical tandem between at least first and second electrooptic modulator paths.

In FIGS. 1A and 1B, a crystal 10 of a suitable electrooptic modulator material, e.g., a crystal member of lithium tantalate, is employed. The technique of electrooptic modulation per se is well known and only sufficient details thereof will be given herein to make clear the concept of utilizing beam reflection therein for phase reversal. A light source 11 provides a beam 12 of plane polarized light which is directed onto the left-hand surface 13 of crystal 10. The surface 13 is also the one illustrated in the end view of FIG. 1B. Source 11 may be any source suitable for providing a light beam for electrooptic modulation, and advantageously comprises a laser source of light having a wavelength of 6328 A. in a beam of approximately 3 mils diameter. Such beam is advantageously plane polarized with the electric vector oriented approximately in the plane of FIG. 1A and in a plane which is parallel to the surface 13.

Beam 12 and its paths within crystal 10 are indicated schematically by the same dashed lines in the drawing. Within crystal 10 the beam 12 is transmitted along a first path 16 which is parallel to the longitudinal dimension of the crystal. The crystal might be designated a rectangular type of crystal in that it has a longitudinal dimension which is much greater than the height or width dimensions of the crystal. For example, crystal 10 is advantageously approximately 150 mils in length as shown in FIG. 1A, and has an approximately square cross section as shown in FIG. 1B of about 56 mils on a side.

The beam 12 is projected along the path 16 until it impinges upon a first light-reflecting, planar surface 17 which is at an angle $\alpha$ with respect to the longitudinal dimension of crystal 10. It is assumed that crystal 10 is located in an atmosphere of lower density than the density of the crystal itself, e.g., in air. The angle of incidence of the beam in path 16 upon the surface 17 is at an angle with respect to the normal to surface 17 at the point of incidence which is greater than the critical angle.

Beam 12 is reflected downward from the surface 17 to impinge upon a second planar surface 18 at a point which is advantageously somewhat to the right of the point of incidence upon the surface 17. It can be seen in FIGS. 1A and 1B that the surface 18 extends along the full longitudinal dimension of the crystal and is formed by the truncation of a longitudinal corner of the crystal 10. However, it is only necessary that the surface 18 be formed in a sufficient portion of the righthand end of crystal 10 to allow the beam 12 to be reflected from the surface 18 upward and to the right to impinge upon a third, light-reflecting, planar surface 19. The beam 12 is reflected to the left from the surface 19 into a path 20 which is parallel to the path 16, and wherein the light beam is projected in the opposite direction through end surface 13 to a utilization device 21. The third surface 19 is at an angle $\pi/2 - \alpha$ with respect to the longitudinal dimension of the crystal 10. Beam paths 16 and 20 are schematically represented by correspondingly numbered circles in FIG. 1B.

The three surfaces 17, 18, and 19 are all perpendicular to a plane which includes both of the first and second beam paths 16 and 20. Surface 17 intersects surface 19 along a line 22 which is perpendicular to the plane of those beam paths. Similarly, surface 18 intersects surface 19 along a line 23 which is also perpendicular to the plane of the beam paths. This relationship of the light reflecting surfaces with respect to the beam paths within the crystal can be stated differently in that the normals to the three light reflecting surfaces 17, 18, and 19, at the points of beam incidence upon the respective surfaces, all lie in the same plane as the beam paths 16 and 20. This common plane of incidence serves as a reference plane for describing components of the electric vector. The component parallel to it is called the "$p$" component; the component perpendicular to it, the "$s$" component.

In an embodiment employing lithium tantalate for the crystal 10, and which crystal material has an index of refraction of 2.1775, a 180° phase retardation between the $s$ and $p$ components in the beam 12 is obtained for a crystal wherein the angle $\alpha$ is either 28.4° or 30.7°. The two possibilities are available in view of the fact that multiple reflections at angles of incidence other than the angle of maximum phase retardation are employed; and, consequently, the humped nature of the retardation-versus-incidence characteristic allows two possibilities for the angle of incidence at each reflection. However, selection of the angle $\alpha$ for a particular embodiment fixes the one of the two possibilities that must be used.

From the geometry of the crystal 10 in FIG. 1A, and the orientation already described for the beam paths 16 and 20, it can be determined that the angles $\Phi_1$, $\Phi_2$, and $\Phi_3$ of incidence of the light beam 12 on the three surfaces 17, 18, and 19, respectively, are given by the following three expressions wherein the angles of incidence are measured with respect to normals to the respective surfaces:

$$\Phi_1 = \pi/2 - \alpha$$

$$\Phi_2 = \pi/2 - 2\alpha$$

$$\Phi_3 = \alpha.$$

Thus, in the absence of modulation, the relative phase of the s and p components of the electric vector of beam 12 upon entering crystal 10 through end surface 13 is 180° in advance of that phase when the beam exits from the crystal 10 through the same surface.

In order to achieve temperature compensated electrooptic modulation within crystal 10, electric fields are applied across the crystal to affect the beam 12 separately in the paths 16 and 20. These fields are applied along the longitudinal dimension of the crystal 10 in a direction which is parallel to the c-axis of the crystal as indicated by a correspondingly designated arrow in FIG. 1B. That axis is also perpendicular to the direction of beam paths 16 and 20. The c-axis is sometimes otherwise designated as the $x_3$-axis or the z-axis in other systems of notation. Likewise, in a binary notation system it is designated as the 110-axis, i.e., an axis that is normal to the 110 plane of the crystal.

The aforementioned electric fields are advantageously provided in a pulsed form in synchronism with the application of light pulses from the source 11 by a modulation driver 26. The output of driver 26 is applied across crystal 10 in the vicinity of the first path 16 by electric circuit connections to electrodes 27 and 28 on opposite longitudinal faces of the crystal 10 in the vicinity of the first beam path 16. The same output of the driver is applied in opposite phase through electric circuits connected to an additional pair of electrodes 29 and 30 which are bonded to the same opposite longitudinal faces of crystal 10 but in the vicinity of the second beam path 20. Thus, the modulating electric field provided through electrodes 27 and 28 affects only the beam path 16, and the modulating field provided by electrodes 29 and 30 affects only the second beam path 20.

Because of the reversal of the phase with respect to one another of the s and p components of the electric vector of beam 12 by the previously described multiple reflections within the crystal, and because of the oppositely phased modulating signal drives for the beam paths 16 and 20, the modulation effects provided by driver 26 are additive. However, temperature effects are substantially uniform along the crystal and in all parts thereof; and because of the multiple reflections, these temperature effects influence the beam in opposite senses in the two paths 16 and 20 and thereby offset one another. It will thus be seen that electrooptic modulation is achieved with the unitary crystal 10 with relative freedom from both the temperature effects of the environment in which the crystal is located and the temperature effects generated by the modulation function within the crystal.

Figure 2:
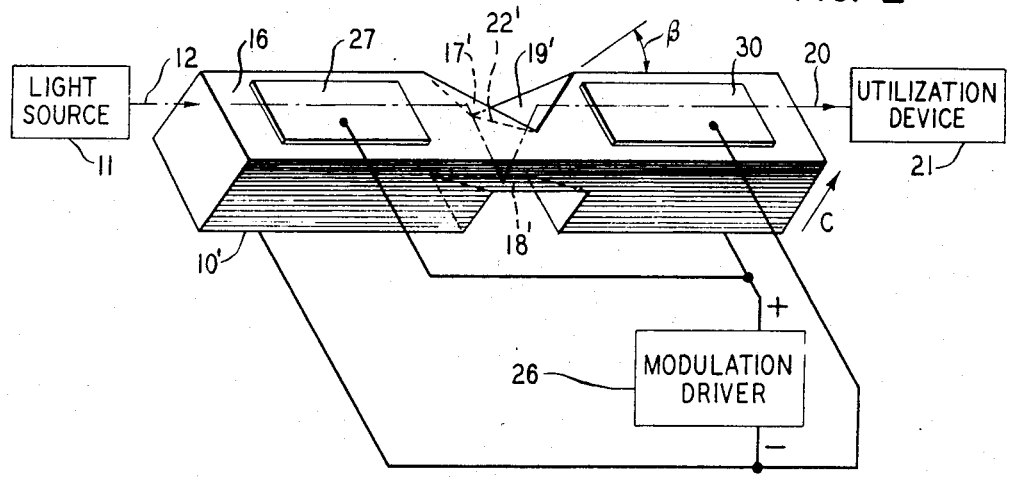
FIG. 2 is a perspective view of a further embodiment of the invention.

FIG. 2 illustrates a further embodiment of the invention wherein the first and second beam paths 16 and 20 are parallel but essentially collinear and directed in the same direction, rather than being oppositely directed as was the case in the previously described embodiment. Here similar modulator parts are designed by the same or similar reference characters. Higher modulation frequencies are more easily realizable in the embodiment of FIG. 2 than in the embodiment of FIGS. 1A and 1B because FIG. 2 lends itself better to utilization of the aforementioned Biazzo et al. acoustically damped mounting arrangement.

The crystal 10' in FIG. 2 is of approximately twice the length of the crystal 10, and the light reflecting surfaces are provided by appropriately configured notches in the central portion of the crystal. Thus, a generally V-shaped notch is provided centrally along the longitudinal dimension of crystal 10', as shown in FIG. 2, to form light-reflecting planar surfaces 17' and 19' intersecting along the line 22'. An additional notch of a truncated V shape is provided adjacent to line 22' so that the truncation forms in the bottom of that notch the light-reflecting surface 18'. This surface 18' is parallel to the paths 16 and 20 and to the intersection line 22'. Surfaces 17', 18', and 19', and line 22', are all perpendicular to a plane including the paths 16 and 20. Surface 18' is also oriented at an angle which is approximately 45° with respect to the c-axis of the crystal 10' as was the case for the surface 18 in FIGS. 1A and 1B.

In the embodiment of FIG. 2, the expressions for the angles $\Phi_1'$, $\Phi_2'$, and $\Phi_3'$ of incidence of the beam 12 upon the three reflecting surfaces 17', 18', and 19', respectively, are somewhat different from the corresponding expressions mentioned in connection with FIGS. 1A and 1B. These expressions for FIG. 2 are as follows for the case wherein the surfaces 17' and 18' are at the same angle $\beta$ with respect to the longitudinal dimension of crystal 10':

$$\Phi_1' = \pi/2 - \beta$$

$$\Phi_2' = \pi/2 - 2\beta$$

$$\Phi_3' = \pi/2 - \beta .$$

In this embodiment, the choice of a value of 28.4° for Δ produces a maximum total phase retardation $\delta' = \delta_1' + \delta_2' + \delta_3'$ of 178.6°. Although this arrangement does not allow the complete phase reversal which is desired for theoretically perfect operation, it is a practical approximation of phase reversal which is suitable for many electrooptic modulator applications that may not warrant the manufacturing effort to produce a crystal with more than three reflections.

Although the present invention has been described in connection with particular embodiments thereof, it is to be understood that additional embodiments and modifications which would be obvious to those skilled in the art are included within the spirit and scope of the invention.

What is claimed is:

1. A member capable of transmitting light and having at least first and second paths therein for the transmission of a light beam in tandem succession,
   means for producing a phase reversal in only one of the orthogonal components of the transverse electric vector of said beam,
   said producing means comprising at least one light reflecting surface on said member and arranged in optical tandem with, and between, said paths for coupling said beam between said paths entirely within said member.

2. The light beam transmitting member in accordance with claim 1 in which
   said member is a crystal having a c-axis perpendicular to the directions of said paths, and
   first and second ones of said light-reflecting surfaces intersect each other along a line at about 45 degrees with respect to said c-axis.

3. The light beam transmitting member in accordance with claim 1 in which
said member is an electrooptic modulator crystal having coupled thereto
means for applying a first electric field parallel to the c-axis of said crystal along said first path and perpendicular to such path,
means for applying a second electric field parallel to the c-axis of said crystal along said second path and perpendicular to such path, and
means for driving said first and second field applying means with reversed polarities with respect to one another in order to modulate said beam.

4. The member in accordance with claim 1 in which
said member is a unitary member of a substantially uniform type of material.

5. The member in accordance with claim 1 in which
said member comprises a material having a predetermined critical angle above which plane polarized light undergoes total internal reflection, and
each angle of incidence of said beam with respect to a normal to each said surface at the point of incidence thereon is greater than said critical angle.

6. The member in accordance with claim 1 in which
said member is a crystal having a c-axis perpendicular to the directions of said paths, and
said beam is a plane polarized light beam having its plane of polarization substantially at 45 degrees to said c-axis at the beginning of said tandem succession.

7. The member in accordance with claim 1 in which
said paths intersect at near normal incidence a common face of said member along parallel lines,
two of said surfaces are adjacent surfaces of said crystal each intersecting a different one of said paths at angles which are complements of 90 degrees, and
each of said two surfaces is perpendicular to a plane including both of said paths.

8. The member in accordance with claim 7 in which
a non-abutting third surface with respect to said first surface for reflecting light is provided within said member,
light deflected from said first path by said first surface is reflected by said third surface onto said second surface to be directed by the latter surface into said second path.

9. The combination in accordance with claim 8 in which
said member is a rectangular crystal having a longitudinal dimension which is substantially larger than either of its width and height dimensions,
said crystal has a c-axis perpendicular to said length dimension and parallel to one of said width or height dimensions,
said first and second paths are parallel to said longitudinal dimension,
said first and second surfaces intersect one another along a line which is oriented at about 45 degrees with respect to said c-axis, and
said third surface is a truncated corner of said crystal extending at least partly along said longitudinal dimension.

10. The member in accordance with claim 1 in which
said paths are approximately collinear and at least three of said light-reflecting surfaces are provided,
a first one of said light-reflecting surfaces comprises a first plane that is parallel to, but laterally displaced from, said paths,
second and third ones of said light-reflecting surfaces comprise second and third intersecting planes that are both perpendicular to a fourth plane including said paths and which fourth plane is also perpendicular to said first plane, and
said second and third planes intersect each other along a line between said first plane and said paths, and intersect said first and second paths, respectively, at substantially equal angles of magnitude suitable for reflecting a light beam from said first path via said second, first, and third surfaces, in that order, to said second path to produce a phase reversal in only one of the orthogonal components of the transverse electric vector.

* * * * *